(12) United States Patent
Roodt et al.

(10) Patent No.: US 8,839,483 B2
(45) Date of Patent: Sep. 23, 2014

(54) WIPER BLADE

(75) Inventors: Inigo Op't Roodt, Hasselt (BE); Peter De Block, Halen (BE); Hans Beelen, Herk de Stad (BE); Bart Fatan, Kermt (BE); Eric Windmolders, Kermt (BE)

(73) Assignee: Robert Bosch GmbH, Stuttgart (DE)

( * ) Notice: Subject to any disclaimer, the term of this patent is extended or adjusted under 35 U.S.C. 154(b) by 950 days.

(21) Appl. No.: 12/999,429

(22) PCT Filed: Apr. 30, 2009

(86) PCT No.: PCT/EP2009/055257
§ 371 (c)(1),
(2), (4) Date: May 26, 2011

(87) PCT Pub. No.: WO2009/153097
PCT Pub. Date: Dec. 23, 2009

(65) Prior Publication Data
US 2011/0247165 A1    Oct. 13, 2011

(30) Foreign Application Priority Data

Jun. 16, 2008  (DE) ......................... 10 2008 002 447

(51) Int. Cl.
*B60S 1/38* (2006.01)
*B60S 1/40* (2006.01)
(52) U.S. Cl.
CPC ............. *B60S 1/3884* (2013.01); *B60S 1/3858* (2013.01); *B60S 1/3851* (2013.01); *B60S 1/3881* (2013.01); *B60S 1/3887* (2013.01); *B60S 2001/3829* (2013.01)
USPC .................................. 15/250.43; 15/250.361
(58) Field of Classification Search
CPC .... B60S 1/3851; B60S 1/3874; B60S 1/3858; B60S 1/3884; B60S 1/3875; B60S 1/3881

USPC ............. 15/250.43, 250.361, 250.44, 250.46, 15/250.451, 250.201, 250.32
See application file for complete search history.

(56) References Cited

U.S. PATENT DOCUMENTS 3,116,506 A * 1/1964 Browne et al. ............. 15/250.48
5,459,900 A * 10/1995 Mege et al. ................ 15/250.48
(Continued)

FOREIGN PATENT DOCUMENTS

DE    102004019158 A1    11/2005
DE    202006015206 U1    12/2006
(Continued)

OTHER PUBLICATIONS

PCT/EP20091055257 International Search Report.

*Primary Examiner* — Gary Graham
(74) *Attorney, Agent, or Firm* — Michael Best & Friedrich LLP

(57) ABSTRACT

The invention relates to a wiper blade (10) having a support composed of a plurality of support components (12, 14, 16, 18, 20) that are joined to one another by welding, gluing, or the like and have at least one longitudinal channel (34) incorporating a pre-curved elastic support element (36) and two parallel retaining rails (28) separated by a longitudinal gap (32), for a wiper strip (38), wherein a connecting element (50) is arranged in the center region of the wiper blade (10) for the articulated connection to a wiper arm. It is proposed that at least two support elements in the form of spring bars (36) having a round cross-section are provided in corresponding separate longitudinal channels (34), between which the retaining rails (28) are arranged.

17 Claims, 3 Drawing Sheets

(56) References Cited

U.S. PATENT DOCUMENTS

| | | |
|---|---|---|
| 6,523,218 B1 | 2/2003 | Kotlarski |
| 7,712,180 B2 | 5/2010 | Hoshino et al. |
| 2006/0090282 A1 | 5/2006 | Hoshio |

FOREIGN PATENT DOCUMENTS

| | | |
|---|---|---|
| JP | 2007269170 A | 10/2007 |
| WO | 99/36300 A1 | 7/1999 |

* cited by examiner

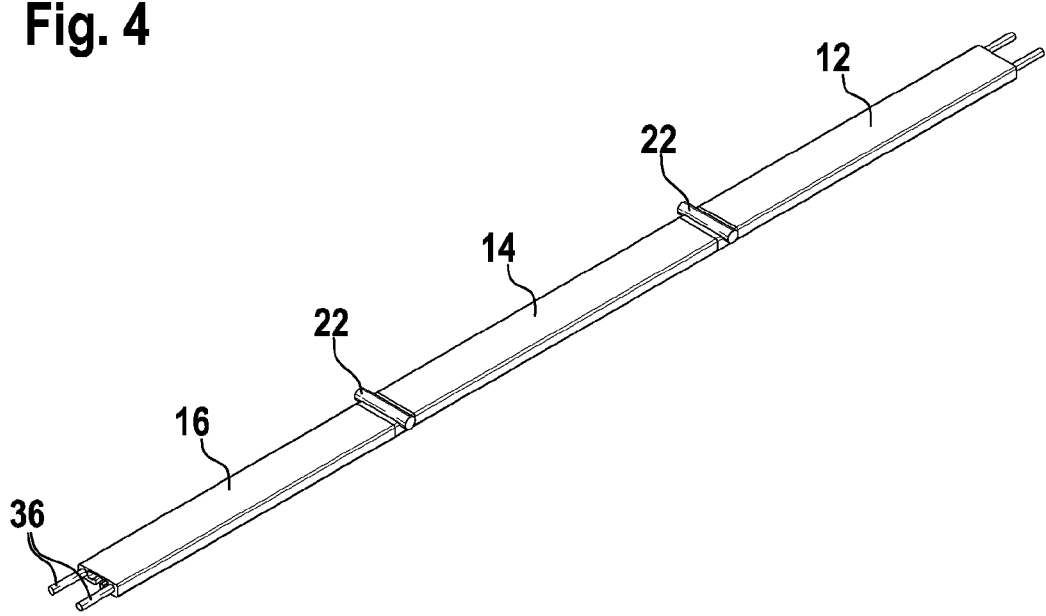
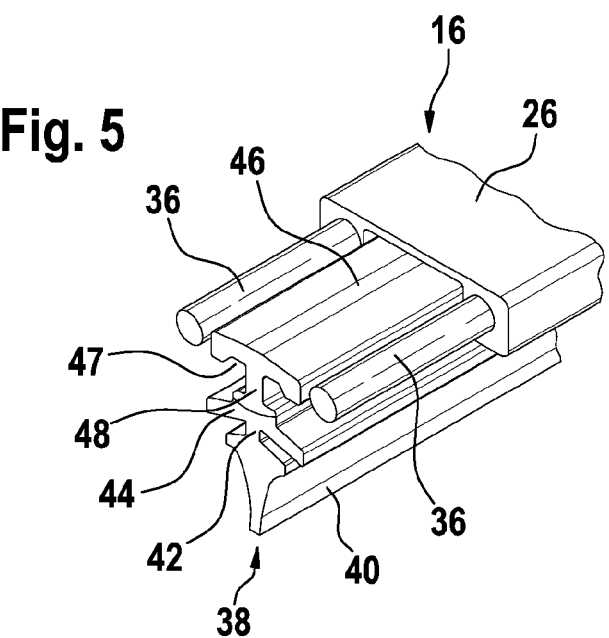

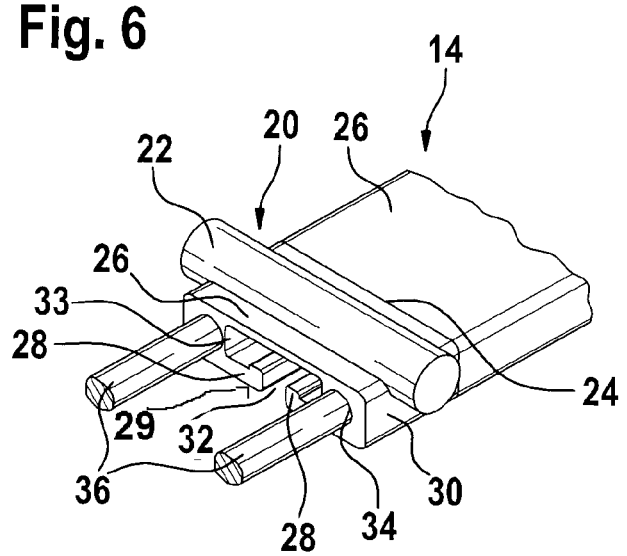
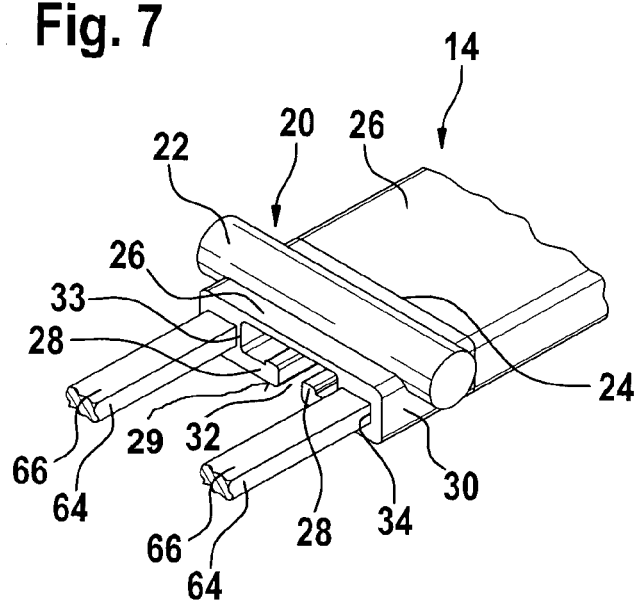

WIPER BLADE

BACKGROUND OF THE INVENTION

The invention is based on a wiper blade.

DE 198 01 058 A1 discloses a wiper blade which has a metallic spring rail which is elongated in the manner of a band and is curved concavely with respect to the window surface, as supporting element. Said spring rail is accommodated in a longitudinal channel in a support made from plastic. The support is divided transversely in the central section thereof such that the support parts can be pushed onto the spring rail from the ends. The support parts can be connected to one another by adhesive bonding, welding or the like at the separating edges bearing against one another. A connection element which is fixedly connected to the support or to the spring rail serves for the articulated connection of the wiper blade to a wiper arm. During operation, the wiper blade glides with a wiper strip over a vehicle window. The wiper strip is held by holding rails which are integrally formed on the support and engage in two longitudinal grooves of the wiper strip. In this case, the spring rail is arranged on a wiper strip side which faces away from a wiper lip of the wiper strip.

Furthermore DE 10 2004 019 158 A1 discloses a wiper blade in which two band-like, pre-curved spring rails are inserted laterally in longitudinal grooves in a head strip of a wiper strip of the wiper blade. A support is guided on those parts of the spring rails which protrude laterally out of the longitudinal grooves, said support holding the spring rails together and protecting the latter toward the outside. On the side facing away from a wiper lip of the wiper strip, the support has a holding profile for a spoiler. A connection device is provided in the central region of the wiper blade in order to connect the wiper blade to a wiper arm in an articulated manner.

SUMMARY OF THE INVENTION

According to the invention, a longitudinal channel is arranged on each of the outer longitudinal sides of the holding rails, said longitudinal channel having a common top wall with the holding rails and, with the associated holding rail, a common partition running parallel to an outer side wall, the outer boundary of the holding rails lying transversely with respect to the side wall within the corresponding boundary of the longitudinal channels in which a respective supporting element is mounted. A very light, flat wiper blade is therefore produced, in particular by that surface of the head strip of the wiper strip which faces away from the wiper lip ending approximately with the supporting elements. In this case, the extremely flat support optimally protects the supporting elements and the head strip without having a significant adverse effect on the elastic flexibility perpendicularly to the wiping plane. The supporting elements can be spring bars with round cross sections or spring rails with rectangular cross sections, the wide sides of which run transversely with respect to the side walls of the longitudinal channels. According to a refinement of the invention, it is proposed that intermediate pieces are provided between a central support part and two further support parts arranged in each case on an end side with respect to said central support part, said intermediate pieces likewise having longitudinal channels for the supporting elements and having joint elements for the articulated connection of the connection element. The articulated connection of the connection element to the support has the effect of preventing the connection element in the central region from having an adverse effect on the pliability of the wiper strip. Nevertheless, the contact pressure forces are transmitted to the support via the joint elements, which are at a large distance from one another in the longitudinal direction, this resulting in a good distribution of force in the longitudinal direction of the wiper blade. For the unambiguous positional fixing of the bridge part relative to the supporting elements, it is expedient for at least one of the intermediate pieces to be fixed on the supporting elements, for example by adhesive bonding or ultrasonic welding.

The admission of force is further improved by the connection element sitting fixedly on a bridge part which, by means of lateral cheeks, surrounds the intermediate pieces and is mounted by means of hubs on the joint element. The lateral cheeks of the bridge part increase the dimensional rigidity thereof, and therefore the elastic pliability of the wiper blade is determined above all by the spring rails, and an excellent lateral guidance of the support relative to the connection element is produced.

The support parts and intermediate pieces are threaded loosely onto the supporting elements. The end caps are then fitted and fastened to the supporting elements by welding or adhesive bonding. In order to position the connection element unambiguously in the longitudinal direction with respect to the supporting elements, it is expedient also to fix at least one intermediate piece to the supporting elements. There is also the possibility of instead connecting the support parts, the intermediate pieces and the end caps to one another such that only the end caps of the support are fixedly connected to the supporting elements while the supporting elements otherwise lie freely in the longitudinal direction in the longitudinal channels.

The wiper strip is expediently produced in a two-material extrusion process, that part of the head strip which is surrounded by the holding rails and the web between the longitudinal grooves being composed of a stiffer material than the rest of the wiper strip. The wiper strip can therefore be easily and simply threaded between the holding rails of the support. In addition, low frictional forces are produced during the elastic bending of the wiper strip during operation.

BRIEF DESCRIPTION OF THE DRAWINGS

Further advantages emerge from the following description of the drawing. The drawing illustrates exemplary embodiments of the invention. The drawing, the description and the claims contain numerous features in combination. A person skilled in the art will expediently also consider the features individually and put them together to form meaningful further combinations.

In the drawings:

FIG. 4 shows a perspective view of two spring bars with three support parts and two intermediate pieces, FIG. 5 shows an end of a wiper blade according to FIG. 1 on an enlarged scale without the end cap, and FIG. 6 shows an intermediate piece according to FIG. 3 on an enlarged scale, FIG. 7 shows a variant of FIG. 5.

DETAILED DESCRIPTION

Figure 1:
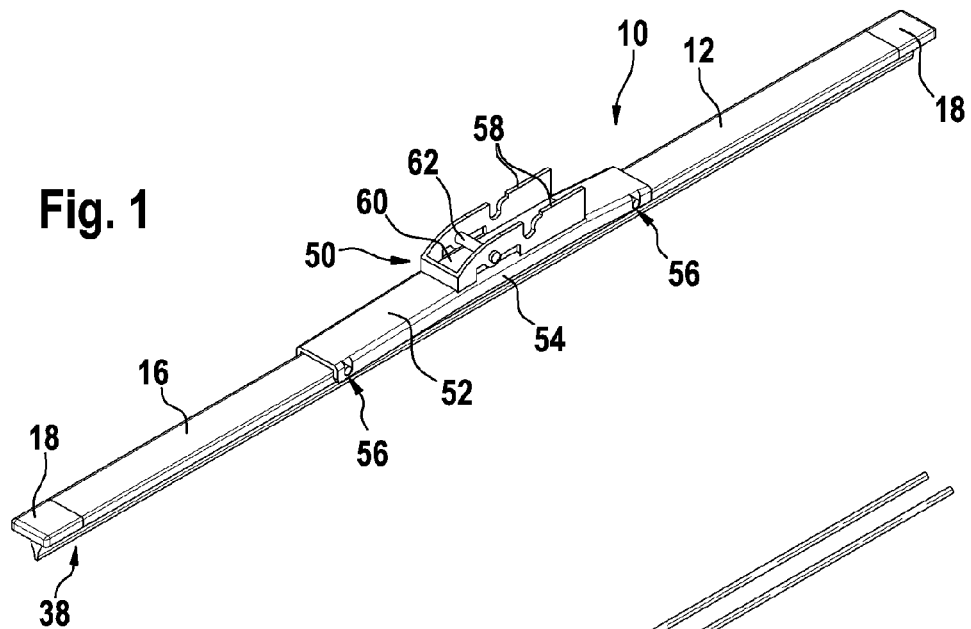
FIG. 1 shows a perspective view of a wiper blade according to the invention.
Figure 2:
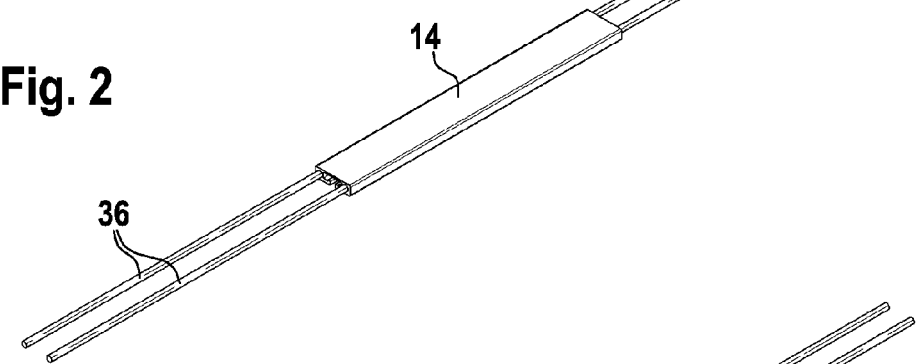
FIG. 2 shows a perspective view of two spring bars with a central support part.
Figure 3:
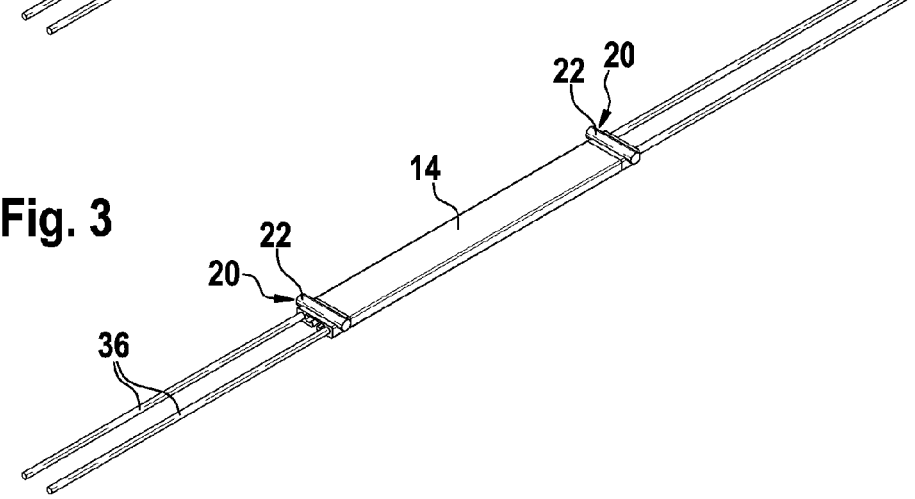
FIG. 3 shows a perspective view of two spring bars with the central support part and two intermediate pieces.

A wiper blade 10 according to FIG. 1 comprises a support with three support parts 12, 14, 16, two end caps 18, a wiper strip 38 and a connection element 50 for the articulated connection to a wiper arm (not illustrated specifically). Intermediate pieces 20 are provided between the central support part 14 and the outwardly adjoining support parts 12 and 16.

The support parts 12, 14, 16 and the intermediate pieces 20 and the end caps 18 are of substantially identical design in cross section. They have a top wall 26 adjoined on both longitudinal sides by side walls 30. Holding rails 32 which form a longitudinal gap 32 therebetween are integrally formed, angled inward, on the free edges of the side walls 30. On the longitudinal sides, longitudinal channels 34 are provided between the top wall 26, the side walls 30 and the holding rails 28. The support parts 12, 14, 16 and the intermediate pieces 20 are threaded individually from the ends onto supporting elements which can be designed as spring bars 36 with round cross sections or as spring rails 64 with rectangular cross sections. End caps 18 are finally fitted onto the supporting elements 36, 64 and fixedly connected thereto by adhesive bonding or welding, in particular ultrasonic welding. In addition, at least one of the intermediate pieces 20 can be fixedly connected to the supporting elements 36, 64. A further possibility is that the support elements 12, 14, 16 and the intermediate pieces 20 are connected to one another on the end sides by welding, in particular ultrasonic welding or adhesive bonding, and the end parts 12, 16 are connected to the end caps 18. This can take place when the parts 12, 14, 16, 18, 20 are fitted on the supporting elements 36, 64 or except for one of the end caps 18 before they are fitted onto the supporting elements 36, 64.

The end caps 18 are closed on the outer end side thereof such that the spring bars 36 are secured in the longitudinal direction. In addition, it may be useful to fixedly connect at least one of the end caps 18 and/or one of the intermediate pieces 20 to the supporting elements 36, 64.

The cross section of the wiper strip 38 is constructed in a customary, tried and tested manner. A wedge-shaped wiper lip 40 is connected via a tilting web 42 to the head strip 46. The latter has, toward the wiper lip 40, supporting strips 44, on each of which one of the opposite surfaces of the wiper lip 40 is supported during the wiping movement.

In order to facilitate the installation of the wiper strip 38, the wiper strip 38 is produced in a two-material extrusion process from two different materials, to be precise the web 48 between the longitudinal grooves 47 and that part of the head strip 46 which is surrounded by the holding rails 28 is produced from a harder, stiffer material than the remaining part of the wiper strip 38.

The connection element 50 is connected to the support 12, 14, 16, 18, 20 in an articulated manner. For this purpose, the intermediate pieces 20, on the side facing the connection element 50, have joint elements 22 which protrude laterally over the side walls 30 of the intermediate pieces 20. A bridge part 52 is mounted in an articulated manner on the said joint elements by means of hubs 56. The hubs 56 are located in lateral cheeks 54 by means of which the bridge part 52 laterally surrounds the intermediate pieces 20. The bridge part 52 forms a clearance between the joint elements 22 for the support part 14 such that the wiper strip 38 can be freely adapted to a curvature of a vehicle window. In this case, the contact pressure force of the wiper arm is favorably transmitted to the wiper strip 38 via the joint elements 22.

The connection element 50 is fastened to the bridge part 52 on that side thereof which faces away from the wiper strip 38. The connection element can have any known form. In the present case, it has a base 60 which is connected to the bridge part 52 in a suitable manner by riveting, welding, adhesive bonding, clipping or the like. Two side parts 58 which extend in the longitudinal direction are angled from the base 60 in the opposite direction to the wiper lip 40. The side parts 58 bear a joint bolt 62 therebetween as a bearing element, via which the wiper blade 10 can be connected in an articulated manner to the wiper arm (not illustrated).

The invention claimed is:

1. A wiper blade (10) with a support which is composed of a plurality of support parts (12, 14, 16, 18, 20) which have a plurality of longitudinal channels (34) each with at least one pre-curved elastic supporting element (36, 64), and have two parallel holding rails (28), which are separated by a longitudinal gap (32), for a wiper strip (38), wherein a connection element (50) for the articulated connection to a wiper arm is arranged in a central region of the wiper blade (10), wherein one of said longitudinal channels (34) is arranged on each of the outer longitudinal sides of the holding rails (28), said longitudinal channels having a common top wall (26) with the holding rails (28) and each of said longitudinal channels having, with an associated holding rail (28), a common partition (33) running parallel to an outer side wall (30), an outer boundary of the holding rails (28) lying transversely with respect to the side wall (30) within a corresponding boundary of the longitudinal channels (34) in which a respective supporting element (36, 64) is mounted, and wherein intermediate pieces (20) are provided between a central support part (14) and in each case two further support parts (12, 16) arranged on each side with respect to said central support part, said intermediate pieces likewise having longitudinal channels (34) for the supporting elements (36, 64) and having joint elements (22) for the articulated connection of the connection element (50).

2. The wiper blade (10) as claimed in claim 1, characterized in that the supporting elements are spring bars (36) with round cross sections or spring rails (64) with rectangular cross sections, the wide sides (66) of which run transversely with respect to the side walls (30) of the longitudinal channels (34).

3. The wiper blade (10) as claimed in claim 2, characterized in that one of the intermediate pieces (20) is fixedly connected to the supporting elements (36, 64).

4. The wiper blade (10) as claimed in claim 3, characterized in that an end cap (18) which is fixedly connected to the supporting elements (36, 64) is provided on the supporting elements (34) at each end of the wiper blade (10).

5. The wiper blade (10) as claimed in claim 4, characterized in that the connection element (50) sits fixedly on a bridge part (52) which, by means of lateral cheeks (54), surrounds the intermediate pieces (20) and is mounted by means of hubs (56) on the joint elements (22).

6. The wiper blade (10) as claimed in claim 5, characterized in that the wiper strip (38) has a head strip (46) with two longitudinal grooves (47) which are separated by a web (48) and in which the holding rails (28) engage, the supporting elements (34) running in the longitudinal channels (34) to a side of the head strip (46), and a wiper lip (40) being connected to the head strip (46) via a tilting web (42).

7. The wiper blade (10) as claimed in claim 6, characterized in that the wiper strip (38) is produced in a two-material extrusion process, a part surrounded by the holding rails (28) and the web (48) between the longitudinal grooves (47) being composed of a stiffer material than a remainder of the wiper strip (38).

8. The wiper blade (10) as claimed in claim 3, characterized in that the support parts (12, 14, 16, 18, 20) are connected to one another by welding or adhesive bonding.

9. The wiper blade (10) as claimed in claim 8, characterized in that the connection element (50) sits fixedly on a bridge part (52) which, by means of lateral cheeks (54), surrounds the intermediate pieces (20) and is mounted by means of hubs (56) on the joint elements (22).

10. The wiper blade (10) as claimed in claim 9, characterized in that the wiper strip (38) has a head strip (46) with two longitudinal grooves (47) which are separated by a web (48) and in which the holding rails (28) engage, the supporting elements (34) running in the longitudinal channels (34) to a side of the head strip (46), and a wiper lip (40) being connected to the head strip (46) via a tilting web (42).

11. The wiper blade (10) as claimed in claim 10, characterized in that the wiper strip (38) is produced in a two-material extrusion process, a part surrounded by the holding rails (28) and the web (48) between the longitudinal grooves (47) being composed of a stiffer material than a remainder of the wiper strip (38).

12. The wiper blade (10) as claimed in claim 1, characterized in that one of the intermediate pieces (20) is fixedly connected to the supporting elements (36, 64).

13. The wiper blade (10) as claimed in claim 1, characterized in that an end cap (18) which is fixedly connected to the supporting elements (36, 64) is provided on the supporting elements (34) at each end of the wiper blade (10).

14. The wiper blade (10) as claimed in claim 1, characterized in that the support parts (12, 14, 16, 18, 20) are connected to one another by welding, or adhesive bonding.

15. The wiper blade (10) as claimed in claim 1, characterized in that the connection element (50) sits fixedly on a bridge part (52) which, by means of lateral cheeks (54), surrounds the intermediate pieces (20) and is mounted by means of hubs (56) on the joint elements (22).

16. The wiper blade (10) as claimed in claim 1, characterized in that the wiper strip (38) has a head strip (46) with two longitudinal grooves (47) which are separated by a web (48) and in which the holding rails (28) engage, the supporting elements (34) running in the longitudinal channels (34) to a side of the head strip (46), and a wiper lip (40) being connected to the head strip (46) via a tilting web (42).

17. The wiper blade (10) as claimed in claim 16, characterized in that the wiper strip (38) is produced in a two-material extrusion process, a part surrounded by the holding rails (28) and the web (48) between the longitudinal grooves (47) being composed of a stiffer material than a remainder of the wiper strip (38).

* * * * *